United States Patent
Blackmon et al.

(10) Patent No.: US 7,539,083 B2
(45) Date of Patent: May 26, 2009

(54) REMOTE VOICE DETECTION SYSTEM

(75) Inventors: Fletcher A. Blackmon, Forestdale, MA (US); Lynn T. Antonelli, Cranston, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 105 days.

(21) Appl. No.: 11/767,644

(22) Filed: Jun. 25, 2007

(65) Prior Publication Data

US 2008/0314155 A1    Dec. 25, 2008

(51) Int. Cl.
*G01H 9/00* (2006.01)

(52) U.S. Cl. .......................... 367/198; 73/655

(58) Field of Classification Search .................. 367/87, 367/198, 199; 73/649, 655; 381/110
See application file for complete search history.

(56) References Cited

U.S. PATENT DOCUMENTS

| | | | |
|---|---|---|---|
| 4,028,492 A | 6/1977 | Sickel | |
| 4,143,648 A | 3/1979 | Cohen et al. | |
| 4,466,738 A | 8/1984 | Huang et al. | |
| 4,554,836 A | 11/1985 | Rudd | |
| 4,612,664 A | 9/1986 | Walsh et al. | |
| 4,821,326 A | 4/1989 | MacLeod | |
| 5,326,349 A | 7/1994 | Baraff | |
| 5,434,668 A | 7/1995 | Wooton et al. | |
| 5,495,767 A | 3/1996 | Wang et al. | |
| 5,838,439 A | 11/1998 | Zang et al. | |
| 5,883,715 A | 3/1999 | Steinlechner et al. | |
| 5,888,187 A | 3/1999 | Jaeger et al. | |
| 6,081,481 A | 6/2000 | Sabatier et al. | |
| 6,174,278 B1 | 1/2001 | Jaeger et al. | |
| 6,188,644 B1 | 2/2001 | Walsh et al. | |
| 6,264,603 B1 | 7/2001 | Kennedy | |
| 6,271,924 B1 | 8/2001 | Ngoi et al. | |
| 6,320,665 B1 | 11/2001 | Ngoi et al. | |

(Continued)

OTHER PUBLICATIONS

Zhu et al, "Integration of Laser Vibrometry with Infrared Video for Multimedia Surveillance Display," City College of New York, AFRL/HECB Grant Final Performance Report, Dec. 2004.*

(Continued)

*Primary Examiner*—Ian J Lobo
(74) *Attorney, Agent, or Firm*—James M. Kasischke; Michael P. Stanley; Jean-Paul A. Nasser

(57) ABSTRACT

A device and system to remotely detect vocalizations of speech. The skin located on the throat region of a speaking person or a reflective layer on the skin on the throat region vibrates in response to vocalizations of speech by the person. The vibrating skin or reflective layer is reflective of impinging radiation. A laser Doppler vibrometer transmits radiation onto the vibrating skin or the covering reflective layer and receives reflected radiation from the vibrating skin or reflective layer. The laser Doppler vibrometer generates voltage output signals that are representative of the speech causing the vibrations. A target tracker directs the impinging radiation and detects the reflected radiation to pass between the throat region and the laser Doppler vibrometer and includes a processor that removes non-speech signal artifacts from the voltage output signals. An interconnected audio speaker reproduces the speech from the voltage output signals.

4 Claims, 4 Drawing Sheets

U.S. PATENT DOCUMENTS

| | | |
|---|---|---|
| 6,487,531 B1 | 11/2002 | Tosaya et al. |
| 6,505,130 B1 | 1/2003 | Springer, III et al. |
| 6,588,428 B2 | 7/2003 | Shikani et al. |
| 6,915,217 B2 | 7/2005 | Springer, III et al. |
| 6,972,846 B2 | 12/2005 | Lal et al. |
| 6,993,378 B2 * | 1/2006 | Wiederhold et al. ......... 600/509 |
| 7,073,384 B1 | 7/2006 | Donskoy et al. |
| 7,113,447 B1 | 9/2006 | Matthews et al. |
| 7,116,426 B2 | 10/2006 | Lal et al. |

OTHER PUBLICATIONS

Li et al, "Remote Voice Acquisition in Multimodal SUrveillance", 2006 IEEE International Conference on Multimedia and Expo (IEEE Cat. No. 06TH8883C), 2006, p. 4 pp., 14 refs, pp. CD-ROM, ISBN: 1-4244-0366-9. Publisher: IEEE, Piscataway, NJ, USA.*

Lynn T. Antonelli and Fletcher A. Blackmon, Experimental demonstration of remote, passive acousto-optic sensing, Journal of Acoustical Society of America, Dec. 2004, 3393-3403, 116 (6).

Fletcher A. Blackmon and Lynn T. Antonelli, Experimental Detection and Reception Performance for Uplink Underwater Acoustic Communication Using a Remote, In-Air, Acoustic-Optic Sensor, IEEE Journal of Oceanic Engineering, Jan. 2006, 179-187, 31 (1).

Anthony D. Matthews and Lisa L. Arrieta, Acoustic optic hybrid (AOH) sensor, Journal of the Acoustical Society of America, Sep. 2000, 1089-1093, 108 n.3.

* cited by examiner

VOCALIZATION OF THE LETTER "A"

REMOTE VOICE DETECTION SYSTEM

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION (1) Field of the Invention

The present invention relates to an acoustic detection system and more particularly to a system for remotely detecting vocalizations or speech using a laser Doppler vibrometer.

(2) Description of Prior Art

Hand-held or lapel-mounted microphones or microphones on ancillary support equipment have been used to monitor speech signals in order to amplify and/or record the speech signals. Properly placing conventional microphones so that the microphones can reliably pick-up speech can be difficult particularly when the speaker needs unrestricted motion or needs unencumbered access to other equipment. Some compact microphones have been developed that can be held at or next to the throat by straps or adhesives, but these microphones can be uncomfortable and can work loose and lose some of their effectiveness as the microphones remotely transmit speech signals by electromagnetic energy.

Bed-ridden patients that are impaired in the throat region typically use a handheld microphone-like apparatus to provide a low level capability for speech. In use, the apparatus is placed against the throat and amplifies the speech vibrations. However, the speech result can be less than desirable. Furthermore, the use of the patient-assist apparatus can make the patient uncomfortable and the speech sounds that the apparatus produces can make the patient self-conscious.

Thus, a need exists for a device, system and method for remotely detecting and utilizing acoustic speech to provide quality speech sounds.

SUMMARY OF THE INVENTION

It is therefore a primary object and general purpose of the present invention to remotely detect and utilize vocalizations (speech) using laser Doppler vibrometer technology.

It is a further object of the present invention to remotely detect and utilize vocalizations (speech) using a laser Doppler vibrometer technology that does not encumber the speaker.

It is a still further object of the present invention to remotely detect and utilize vocalizations (speech) using at least one laser Doppler vibrometer radiating on and receiving reflections from the throat region at the larynx and/or other parts of the throat.

It is a still further object of the present invention to remotely detect and utilize vocalizations (speech) using a laser Doppler vibrometer radiating on retro-reflective tape and/or coatings at the larynx and/or other parts of the throat.

It is a still further object of the present invention to remotely detect and utilize vocalizations (speech) using a laser Doppler vibrometer having a target tracker in order to permit remote detection of speech.

It is a still further object of the present invention to remotely detect and utilize vocalizations (speech) using a laser Doppler vibrometer having a target tracker that compensates for motion of the target throat region and for motion of the laser Doppler vibrometer.

To attain the objects described, the present invention provides a system and method that assures the remote detection of vocalizations of speech.

Normally, the skin located on the throat region of the larynx of a speaking person or a reflective layer on the skin on the throat region vibrates in response to vocalizations of speech by the speaking person. The vibrating skin or reflective layer is reflective of impinging radiation. In the present invention, a laser Doppler vibrometer transmits radiation onto the vibrating skin or a covering reflective layer and receives reflected radiation from the vibrating skin or the reflective layer. The laser Doppler vibrometer generates voltage output signals that represent the speech causing the vibrations. An audio speaker is coupled to receive the voltage output signals from the laser Doppler vibrometer in order to reproduce the speech from the output voltage signals.

A target tracker is provided to assist in the remote detection of speech as the speaking person moves about and as the laser Doppler vibrometer is moved relative to the throat region. The target tracker continuously steers the beams to and from the laser Doppler vibrometer to obtain continuous detection of speech as the speaking person or laser Doppler vibrometer moves. The generated voltage output signals are representative of the speech information of the reflected radiation with signal artifacts caused by the motion of the speaking person and/or of the laser Doppler vibrometer. The target tracker can also filter out signals attributed to motions of the laser Doppler vibrometer from the voltage output signals. The target tracker can also filter/subtract out signals caused by non-speech motions of the throat region of the speaking person from output voltage signals and can generate compensated output signals that create reproduced speech at audio speakers from the voltage output signals.

BRIEF DESCRIPTION OF DRAWINGS

Other objects, features and advantages of the present invention will become apparent upon reference to the following description of the preferred embodiments and to the drawings, wherein corresponding reference characters indicate corresponding parts in the drawings and wherein.

DETAILED DESCRIPTION OF THE INVENTION

Figure 1:
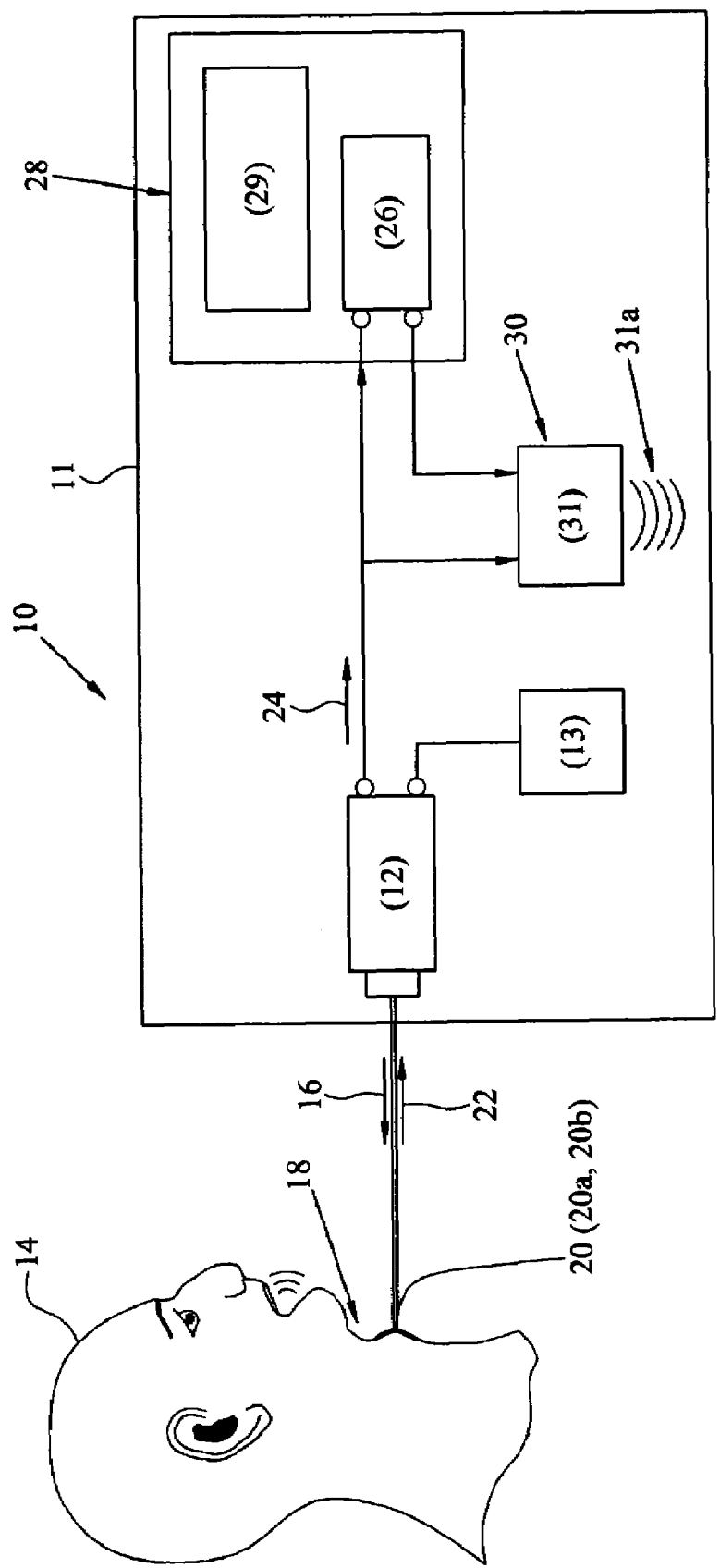
FIG. 1 schematically depicts the remote voice detection system of the present invention detecting and processing speech vocalizations from a remotely-located speaking individual.

A more complete understanding of the invention and many of the attendant advantages thereto will be readily appreciated as the same becomes better understood by reference to the following detailed description when considered in conjunction with the accompanying drawings wherein like reference numerals and symbols designate identical and corresponding parts through the views and wherein the remote voice detection system 10 of the invention, depicted in FIG. 1, is a non-contact means for remotely detecting and utilizing vocalizations (speech).

The remote voice detection system 10 can be mounted on a rigid support platform 11 to help reduce the introduction of anomalies in monitored signals that may otherwise be attributed to accelerations, ambient vibrations, and other random motions. The remote voice detection system 10 has a Laser Doppler Vibrometer (LDV) 12 and a power supply 13 on the support platform 11 remotely located from a speaking person 14 to emit a beam 16 (shown as arrow) of coherent radiation onto the skin of a throat region 18 of the speaking person.

The voice detection system 10 detects vocalizations of the person 14 by using emitted radiation from the LDV 12 to optically interrogate the surface of skin of the throat region 18 that is in mechanical motion due to the acoustic projections of speech and thereby has detectable surface velocity perturbations. In other words, the emitted laser beam 16 from the LDV 12 that is radiated onto the skin on the throat region 18 of the person 14 is used to detect skin vibrations while the person is vocalizing. The throat region 18 may include the surface of the area of skin covering the larynx and the tissue extending a few centimeters from the larynx adjacent to and/or around the larynx in the throat that also is set into responsive vibratory motions as the person 14 speaks.

The throat region 18 may have a substantially non-encumbering reflective layer 20 such as a piece of reflective tape 20a or a reflective coating 20b applied by adhering the tape or coating onto the skin of the throat region. Whether or not the skin has an additional reflective layer 20, at least part of the beam 16 is reflected back from the throat region 18 as reflected radiation (or reflected portions), as beam 22 (shown as arrow). The reflected radiation beam 22 is modulated by vibrations of the skin of throat region 18 that are caused by speech of the person 14.

The LDV 12 can be fabricated in accordance with the teachings of known laser vibrometers that use a laser beam from an interferometer to measure surface vibration velocity, see U.S. Pat. Nos. 4,466,738, 4,554,836, 5,495,767, 5,838,439, 5,883,715, 6,081,481, 6,271,924, 6,320,665, 6,505,130, 6,915,217, 6,972,846, 7,073,384, and 7,116,426.

Accordingly, the LDV 12 can have a heterodyne interferometer along with appropriate signal demodulation processing to provide voltage output signals 24 represented by an arrow that are directly proportional to or representative of the surface velocities of skin on the throat region 18 caused by speech of the person 14.

The LDV 12 may be a single sensor, such as a POLYTEC PDV-100, which emits red laser radiation or if desired, a number of laser sensors for multiple acquisition points for the same or different subjects. The operation of an interferometer system and laser Doppler vibrometers are well documented, and laser Doppler vibrometers are commercially available.

The LDV 12 takes advantage of the data gathering capability of laser Doppler vibrometers that have been used as a tool in other applications to measure various vibrating surfaces in order to obtain current acoustic/structural information. For example, the optical beam from a laser vibrometer has been used as a surveillance device by probing windows to detect sound inside buildings and automobiles. Laser vibrometers have also been used to probe the water surface to detect underwater sound, see U.S. Pat. Nos. 5,434,668, 6,188,644, and 7,113,447 as well as publications by Matthews et al., Journal of the Acoustical Soc of Am v 108 n. 3, p. 1089-1093, September 2000: Blackmon, F. et al., IEEE Journal of Oceanic Engineering, 31(1): 179-187, January 2006; and Antonelli, L. et al., Journal of the Acoustical Soc of Am, 116(6): 3393-3403, December 2004.

The emitted laser radiation beam 16 from the LDV 12 is focused onto and reflected directly from the skin of the throat region 18, or the emitted radiation beam 16 is directly radiated onto the reflective layer 20 on the skin of the throat region 18. The reflective layer 20 placed on the throat region 18 will enhance the optical reflectivity of the reflected radiation 22 and therefore the quality of the sound recording. However, the addition of the reflective layer 20 is not necessary for the technique of the present invention to accurately measure or capture and reproduce vocalizations.

The optical signals of the reflected radiation 22 are modulated by the vibrations of skin caused by the vocalizations of the person 14. In the LDV 12, these vibrations are optically measured as Doppler velocities, which are then converted to electrical representations of the velocity signals, i.e. voltage output signals 24 (shown as an arrow 24). The raw speech signals are detected by the LDV 12 in real time, and if the person 14 moves, the LDV can be reoriented or re-aimed from the support platform 11 to capture the vibrations of speech of the person. The LDV 12 can redirect to align with any vibrating surface, such as an audio speaker or window in order to capture the sounds causing these surfaces to vibrate.

The analog voltage output signals 24 from the LDV 12 can be connected directly into a microphone input of a computer sound card 26 of a computer 28, and a visual display 29 of the computer can provide a visual representation of one or more aspects of the voltage output signals. The analog voltage output signals 24 can also be directly connected to an audio speaker 31 so that reproduced vocalizations of speech (voice) 31a can be heard. The voltage signal 24 recorded by the sound card 26 of the computer 28 may be output and connected to the audio speaker 31 so that the record vocalizations can be heard. A subwoofer version of the speaker 31 provides quality sound at lower frequencies and generates improved reproduced voice or speech. The speaker 31 may be mounted on a harness-like support that can be worn about the neck of a person.

As a further option, the LDV 12 and the computer 28 can be carried on the support platform 11 that is made to be mobile and carried by the speaking person 14. This equipment could be carried by a suitable harness arrangement (not shown) worn around the neck and resting on the shoulders or the upper chest area of the person 14.

Two computer programs commercially available as MATLAB and AUDACITY can record the data from the computer soundcard 26. Other software, known to those skilled in the art, may be used that enables a user to record and/or play sound through the computer soundcard 26. Soundcards often come with their own software that allows a user to record from 'Line In' or 'Microphone' inputs, save the file to a hard drive, and replay the sound through the soundcard output. Several available programs allow the user to manipulate the sound file, such as amplifying and filtering the sound as well as removing unwanted portions of the sound file.

Figure 2:
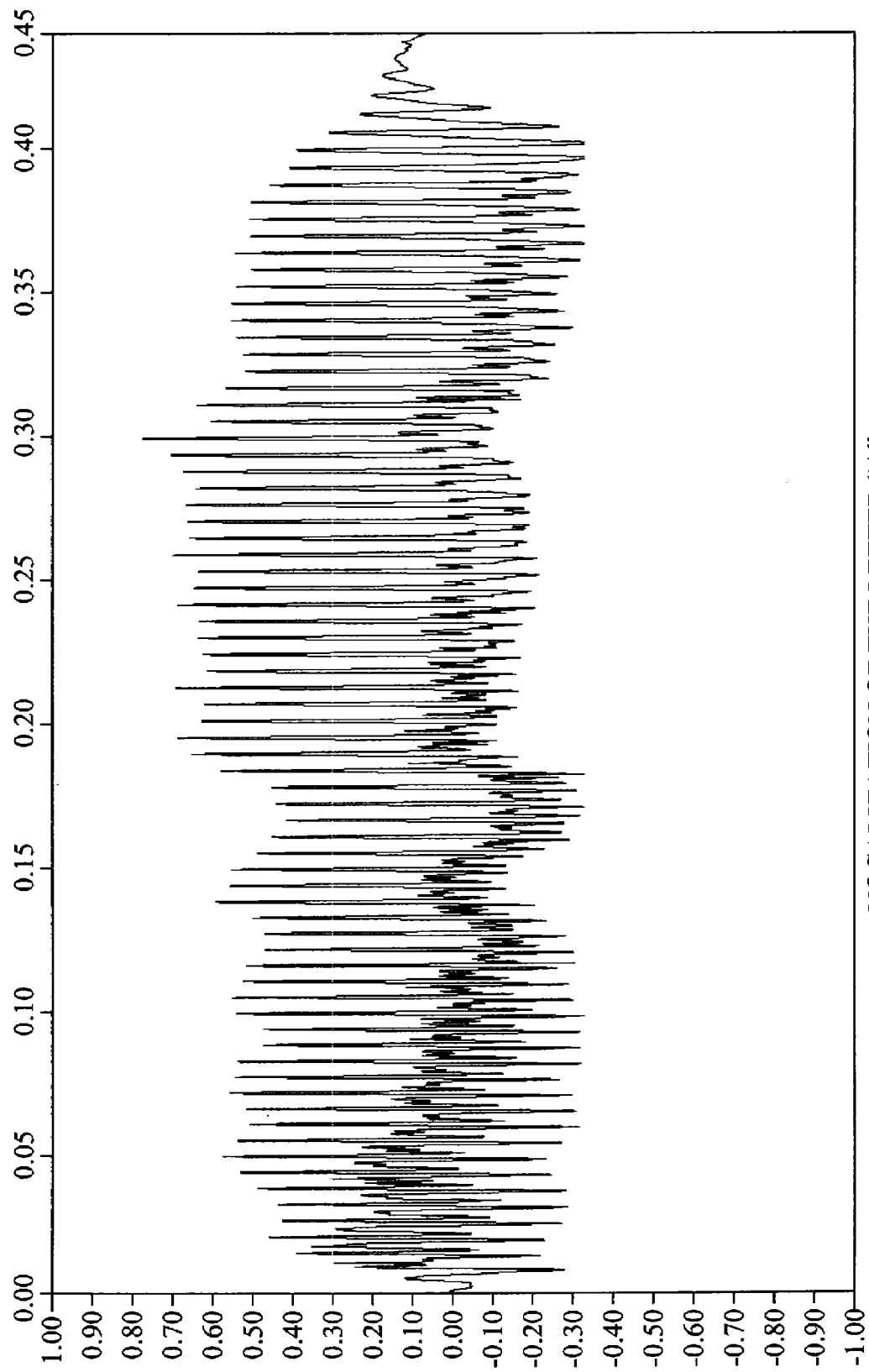
FIG. 2 schematically depicts a screen image of vocalization signals acquired by the remote voice detection system of the present invention for a singing of the letter "A" by an individual.

FIG. 2 schematically depicts an example of the vocalization signal of the voltage output signals 24 recorded using a soundcard. The vocalization of FIG. 2 was recorded with a vibrometer with no reflective layer on the throat region. The vocalization file depicted consists of singing "A".

The remote voice detection system 10 provides a reliable capability of remotely measuring vocalizations. However, specific processing techniques or hardware for signal enhancement of these monitored vocalizations can be used and can be found in other speech assistance devices known to those ordinarily skilled in the art.

The remote voice detection system 10 is depicted as having the LDV 12 located a relatively short distance away from the throat region 18 of the person 14 being monitored. It is understood that the remote voice detection system 10 can be placed at many different distances and bearings with respect to the speaking person 14 and still effectively operate to monitor acoustic speech when a measurable/monitorable portion of the emitted beam 16 of radiation is reflected back from the throat region 18 to the LDV 12 as the reflected radiation beam 22. This distance can be a few meters or hundreds of meters.

The remote voice detection system 10 can have the transmit laser radiation of the LDV 12 as the emitted beam 16 and process the reflected radiation beam 22 in the infrared spectrum to allow an alternative operation of the remote voice detection system. This feature makes the remote voice detection system 10 suitable for covert operations that call for discreet sensing of distantly originating speech. In the relatively fixed as well as in the more mobile embodiments of the remote voice detection system 10, detection of vocalizations may be accomplished with or without an associated system that automatically tracks the target of the throat region 18.

In accordance with the invention of the remote voice detection system 10, various laser Doppler vibrometers may be used to detect the vocalizations of the speaking person 14. The wavelengths of the laser radiation used by the selected vibrometer design for the LDV 12 may vary between interferometer types. However, coherent radiation is necessary for an interferometer to operate, meaning that a laser or laser-like optical source is a necessary part of the interferometer. Other computer software can be used by one of ordinary skill in this art to access and control the computer sound card 26 for recording and playing the recording vocalizations.

The LDV 12 can connect to a variety of conventional analog or digital voltage recording devices. Analog tape recorders may be used to record the signal. Digital voltage recording devices such as the computer 28 via the computer soundcard 26 or other computer data acquisition systems may be used to record the laser-detected vocalizations represented by the voltage output signals. However, digital (computer) recordings require an analog to digital converter to digitize the output data from the LDV 12 during signal acquisition. In this regard some vibrometers that can be used as the LDV 12 and known to those skilled in the art offer an analog and a digital signal output.

In accordance with the present invention, detection of vocalizations can be done with or without a means for tracking the target presented by the throat region 18. These detections may be enhanced with the reflective layer 20 (adhering the reflective tape 20a or placing the reflective coating 20b on the throat region 18).

Optical detection for measuring vocalizations in accordance is effective when at least a measurable part of the emitted beam 16 from the LDV 12 is reflected back from the vocalization target source as the reflected radiation beam 22 toward the laser vibrometer photo-sensors of the LDV 12. The motion of both the LDV 12 and the throat region 18 (with or without the reflective layer 20) will affect the measurement of reflected radiation and consequently the measured sound or speech. Typically, these motions impose a modulation frequency onto the vocalization signal.

Figure 3:
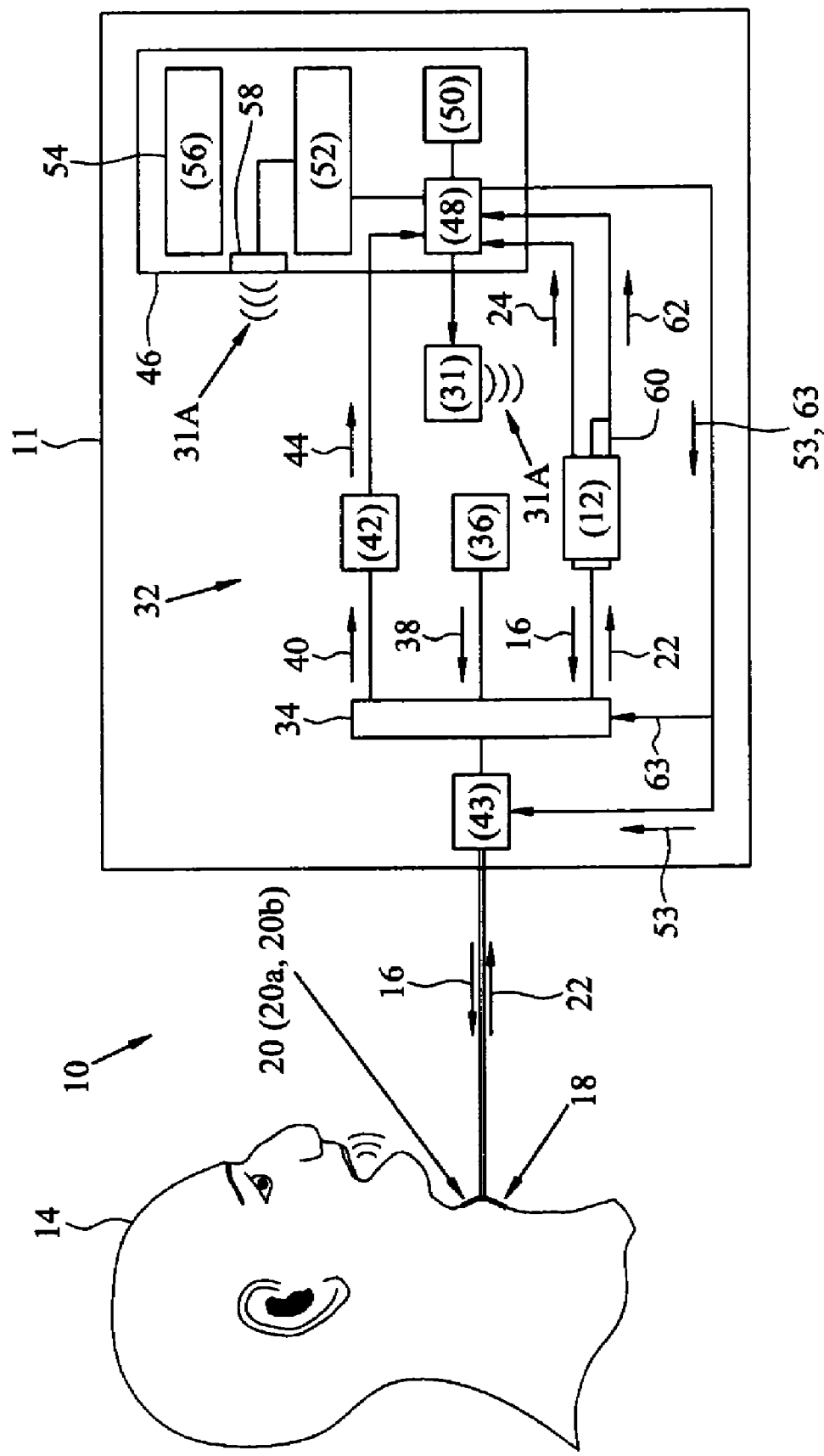
FIG. 3 schematically depicts the remote voice detection system of the present invention including a target tracker detecting and processing speech vocalizations from a remotely-located speaking individual.
Figure 4:
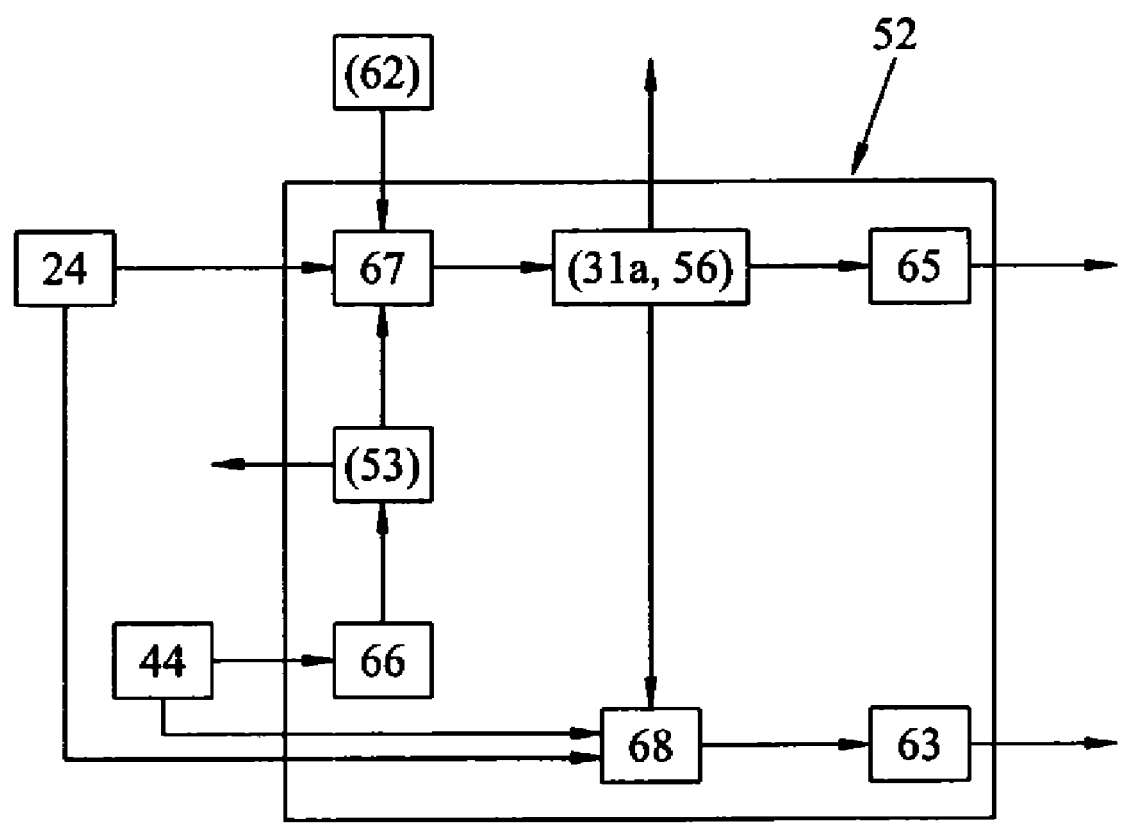
FIG. 4 schematically depicts voice signal processor functions of the target tracker of the remote voice detection system of the present invention.

Referring now to FIG. 3 and FIG. 4, the remote voice detection system 10 provides for a further voice detection capability by inclusion of a target tracker 32 in conjunction with the voice detection configuration of FIG. 1. The target tracker 32 can be mounted on the support platform 11 to aid in the remote detection of vocalizations as the reflected radiation beam 22 comes from a target (the throat region 18) and as the support platform is moved relative to the throat region.

The target tracker 32 provides for a continuous steering of beams to and from the remote voice detection system 10 so that the LDV 12 can generate the voltage output signals 24 that are representative of the speech information of the reflected radiation 22. In other words, the target tracker 32 detects the position of the vocalization target source of the throat region 18 (stationary or in motion) and steers the beam 16 of emitted radiation of the LDV 12 to the position of vocalization at the throat region so that the LDV continuously receives the reflected radiation beam 22 and generates representative voltage output signals 24. The target tracker 32 also provides the capability for filtering/subtracting out signals attributed to motion of the LDV 12 from the voltage output signals 24 that are representative of the desired voice vibration signal. Furthermore, the target tracker 32 provides for subtracting out signals attributed to non-speech motions of the throat region 18 from the voltage output signals 24, and the target tracker can generate appropriate compensated output signals that create reproduced speech at the speaker 31 and speaker 58 from the voltage output signals.

The LDV 12 may be housed with the target tracker 32 on the same support platform 11, or the LDV 12 may be separated from the target tracker and be mounted on a separate support structure at a distance from the support platform (not shown). In either case, the LDV 12 is oriented to direct the emitted radiation beam 16 onto a beam combiner and adaptive focusing optics 34 of the target tracker 32 and receive the reflected radiation 22 at the LDV 12. The target tracker 32 also includes a secondary light source 36, such as an infrared laser that is used to illuminate the measurement target (the throat region 18) with a tracker beam of infrared radiation 38 (shown as an arrow) that can be emitted substantially simultaneously with the emitted radiation beam 16. Optical reflections 40 of the tracker beam 38 from the target of the throat region 18 are reflected back through the focusing optics 34 and onto an optically coupled digital camera 42.

The beam combiner/auto adaptive focusing optics 34 superimpose the beam 16 and the infrared radiation 38 and provide a common focus of these beams and the view of the digital camera 42 onto the target of the throat region 18. Auto focusing determines the distance to the subject and adjusts the optical lens at that focal distance. Both active and passive auto focusing techniques (U.S. Pat. Nos. 7,053,350, 6,979,808, 4,843,416, 4,983,033, 4,602,861, 6,700,615, 6,847,402, 6,928,241, 7,058,294) are commonly used in commercial video cameras and are well-known in the industry. Active auto focusing techniques emit radiation at the subject and determine distance from the reflected signal energy. Passive auto focusing methods typically use contrast information from various focal points or image processing to determine the appropriate focal distance. The distance to the subject is determined actively by processing the laser Doppler vibrometer signal, which contains information on the relative subject position, as well as passively by processing the contrast information contained in the camera image. The present invention is a unique combination of signals for auto focusing the laser Doppler vibrometer as the active auto focus device. The beam combiner/auto focusing optics 34 also capture the reflected radiation beam 22 and the optical reflections 40 from the throat region 18 and respectively, route the reflected beam and the optical reflections to the LDV 12 and the digital camera 42. Known arrangements of such optics are in widespread use in the art and one skilled in the art can provide suitable beam combiner/auto focusing optics 34 in accordance with the present invention without undue experimentation.

The emitted radiation beams 16 from the LDV 12 and the radiation 38 from the light source 36 are transmitted through a steering mirror module 43 back to the laser Doppler vibrometer and the digital camera, respectively. Mechanical beam steering mirror modules, such as galvanometer steering mirrors that are responsively controlled by appropriate control signals are used in known optical systems that rely on the control of beamed energy to scan, reorient, and redirect such beams in real time. Therefore, one skilled in the art can routinely select an appropriate controllable beam steering module from commercially-available resources and modify the module for the intended purposes herein suitable steering mirror module 43 in accordance with this invention. An appropriate galvanometer-based tracker system has been used for tracking eye motion during laser surgery (U.S. Pat. No. 5,767,941).

Signals 44 (shown as an arrow) representative of a camera pixel image or images of the optical reflections 40 are generated in the digital camera 42 and are coupled to a controller 46 of the target tracker 32 via an input/output port 48. The controller 46 can be a computer-equipped with the input/output port 48, a disk drive 50 for data storage, and a computer processor 52 coupled to the input/output port 48. The controller 46 of the target tracker 32 may also can contain a monitor 54 that provides a visual representation 56 of the monitored speech of the person 14 as well as the speaker 58 to transmit the speech 31 and/or may also be connected via input/output port 48 to transmit the reproduced speech at the speaker 31. The computer processor 52 of the controller 46 receives the camera pixel image signals 44 and determines the position of the targeted throat region 18 from the information of the signals 44.

An accelerometer 60 of the target tracker 32 is mounted along an extension of the axis of the beams 16 and the reflected radiation 22 and is known in the art to develop signals 62 (shown as an arrow) representative of intended accelerations/motions of the LDV 12 and feeds these signals to the input/output port 48. The signals 62 can also be generated to compensate for unexpected ambient disturbances and shifts, such as seismic disturbances, traffic, etc., that might otherwise create anomaly signals that could interfere with reliable monitoring of distant speech or conversation. The information of the signals 62 is provided to the controller 46 and onto the computer processor 52 so that the computer processor can filter/subtract out the signals attributed to motion of the LDV 12 from the voltage output signals 24. The signals 62 are created so that the computer processor 52 can generate appropriate compensated output signals that create the speech 31a at the speakers 31 or 58 from the voltage signals output. The computer processor 52 can also compensate for non-speech motions of the vocalization source of the throat region 18 (such as random motion or vibration), by subtracting out signals attributed to these motions that are outside of the range of speech when they are found to be part of the voltage output signals 24.

The computer processor 52 is connected via the input/output port 48 to the LDV 12, the accelerometer 60, and the digital camera 42 to acquire the voltage output signals 24, the signals 62, and the signals 44 from the LDV, the accelerometer, and the digital camera, respectively. The data acquisition system may be comprised of external hardware that is connected to the controller via an input/output (I/O) port such as USB port or other versions that connect through the Firewire (IEEE 1394) ports, which are commercially and readily available. Some commercially available acquisition systems perform the necessary analog to digital signal conversion as an alternative to using the soundcard. The I/O 48 could be a soundcard, USB port, Firewire port, PCMCIA card, PCI card or any I/O card that is supported by the computer controller system. Data acquisition systems such as National Instruments NI-USB 9215A, NI DAQcard-6204E or the NI DAQPad-6070E is connected to the controller via the USB, PCMCIA and Firewire port, respectively.

The remote voice detection system 10 having the target tracker 32 responsively processes the data of voltage output signals 24 including Doppler shifted signals that may be attributed to motion of the person 14 that are outside of the range of speech, the signals 44, and the acceleration signals 62 to remotely detect and produce speech. The computer processor 52 can be programmed to control the interconnected components of the present invention in order to remotely gather the speech signals. Accordingly, the computer processor 52 can be programmed to eliminate irrelevant data from the voltage output signals 24 by filtering or calculating-out such data from the voltage signals that represents signals that are not part of the intelligible speech.

The computer processor 52 can process the signals 44 of the digital camera 42 and uses the pixel position information of signals 44 to generate target coordinate control signals 53 (shown as an arrow), which are used steer the tracker mirrors of steering mirror module 43 the input/output via port 48 to point the measurement laser beam (the emitted beam 16) onto the target throat region 18 and to gather the reflected radiation beam 22. For example, the signals 44 having maximum values would most likely indicate that the reflected energy comes from a part of the throat region 18 that is normal to the emitted beam 16. The programmed computer processor 52 can determine the azimuth and elevation to such a part and to generate the control signals 53. The control signals 53 control the steering mirror module 43 to keep the energy of the emitted beam 16, the infrared radiation 38 and reflected radiation beams 22 and the optical reflection 40 at a maximum level at the particular azimuth and elevation of the location of the part of the throat region 18. If the energy levels of the signals 44 indicate that other individual pixels are becoming or have higher energy levels, then the computer processor 52 will generate suitable control signals 53 to realign the steering mirror module 43 in such a way that the reflected beam 40 and the signals 44 are maximized for the new realignment of beams through the mirror module to and from the throat region 18.

In response to receiving the signals 44 and the voltage output signals 24 that may both be uniformly increasing or decreasing. For example, the computer processor 52 can continuously generate and connect focusing signals 63 to the beam combiner/focusing optics 34 via the input/output port 48. The generated focusing signals 63 can cause the focusing optics 34 to adaptively refocus the beams passing through the steering mirror module 43 to help maintain acceptable levels of the detectable reflected radiation beam 22. The uniform increase or decrease of both inputted signals can be caused by the vocalization target of the person 14 moving to a different distance that is closer or further from the remote voice detection system 10. Thus, continuous tracking by the target tracker 32 assures reliable monitoring of remotely originating speech signals.

Almost simultaneously, the accelerometer 60 couples the acceleration signals 62 to the controller 46 and onto the computer processor 52 so that computer processor can subtract out the signals attributed to motion of the LDV 12 and/or doppler shifts that may otherwise appear in the voltage output signals 24.

The voice and tracker processor functions of the processor 52 of controller 46 are outlined in FIG. 4 and schematically depict the generated signals being utilized to gather and reproduce the audio speech, 31$a$ or visual representations 56 of such speech. The signals inputs 24, 44 and 62 provided from the LDV 12, the digital camera 42 and the accelerometer 60 as well as Doppler shifted signals 64 of the voltage output signals 24 are processed in the computer processor in virtually real-time to responsively generate the coordinate control signals 53 and the focusing control signal 63 and to extract the signal 31$a$ and 56. The laser Doppler vibrometer signal 24 contains the speech signal represented as a voltage level corresponding to the skin surface velocity at the throat region 18. The laser Doppler vibrometer signal 24 also contains velocity signals from the motion of the laser Doppler vibrometer and the motion of the person vocalizing 14. A processor 66 contained in the computer processor 52 accepts the camera image signal 44 and calculates the steering coordinates from which the processor 66 generates the steering control signal 53. A processor 67 contained in the computer processor 52 extracts the speech signal 31$a$ and 56 from the LDV signal 24 by removing the motion artifacts by using the accelerometer signal 62 to remove the LDV 12 motion and using the laser steering position signal 53 from the processor 66. The audio or visual representations 31$a$, 56 can be further analyzed and processed in a variety of optional signal manipulations 65 by the computer processor 52 for a variety of purposes such as for cleaning distorted speech or for speech recognition. The processor 67 contained in the computer processor 52 accepts the laser Doppler vibrometer signal 24, the extracted speech signal laser Doppler vibrometer signal 24, the extracted speech signal 31$a$ and the camera image signal 44 to calculate the focal distance for the auto focus. The processor removes the speech content from the LDV signal 24 to retain the relative motion between the person 14 and the LDV 12 and combines information from the camera image 44 to determine the new auto focal distance control signal 63 which is sent to eh auto focusing optics 34. The signals 53 and 63 appropriate the control steering mirror module 43 and the focusing optics 34 to maintain the detection of the monitored speech 31$a$ or the visual representations 56 of such speech at a monitor 54 by continually positioning the optical beams on the speaking person 14 at the throat location 18 as they move.

While the present invention has been described in connection with the preferred embodiments of the various figures, it is to be understood that other similar embodiments may be used or modifications and additions may be made to the described embodiment of performing the same function of the present invention without deviating therefrom. Therefrom, the present invention should not be limited to any single embodiment, but rather construed in breadth and scope in accordance with recitation of the appended claims.

What is claimed is:

1. A system for remotely detecting vocalizations of speech, said system comprising:

a laser Doppler vibrometer for transmitting radiation onto a throat region of a speaking person and for receiving the radiation reflected from the throat region, said laser Doppler vibrometer generating voltage output signals representative of the vocalizations;

audio speaker means coupled to receive the voltage output signals from said laser Doppler vibrometer for reproducing and transmitting the speech of the vocalizations from the output voltage signals;

means for computing coupled to receive the voltage output signals;

means coupled to said computing means for displaying the received representative signals;

a target tracker including a secondary light source to illuminate the throat region with an infrared tracker signal;

a digital camera receiving optical reflections and generating representative digital image signals of the optical reflections with the digital image signals having pixel position information;

an accelerometer mounted along the axis of the emitted radiation and reflected radiation of said laser Doppler vibrometer to develop signals representative of accelerations of said laser Doppler vibrometer and to couple the acceleration signals to said computing means wherein signals attributed to motion of said laser Doppler vibrometer are separable from the voltage output signals to create resultant output signals that compensate for ambient and non-speech vocalization disturbances;

a controller with said computing means to receive the digital image signals from said digital camera and the voltage output signals from said laser Doppler vibrometer;

a steering mirror module connected to said computing means, said steering mirror module receiving and steering emitted radiation and a tracker beam and the reflected radiation and the optical reflections; and a beam combiner/focusing optics coupled to said computing means, said steering mirror module, said laser Doppler vibrometer, and said digital camera to gather and focus the emitted radiation, the reflected radiation, the tracker beam and the optical reflections.

2. The system of claim 1 wherein said computing means processes the digital image signals of the digital camera and uses the pixel position information to generate target coordinate control signals, the control signals being used to steer tracker mirrors of said steering mirror module to point the emitted radiation onto the throat region and to pass the reflected radiation from the throat region to said beam combiner/focusing optics.

3. The system of claim 2 wherein said computing means processes the digital image signals and the voltage output signals to generate focusing signals for said beam combiner/focusing optics to adaptively refocus beams passing through said steering mirror module.

4. The system of claim 3 wherein said controller includes at least one interconnected speaker to transmit reproduced speech and a monitor to provide a visual representation of monitored speech.

* * * * *